Figure 1:
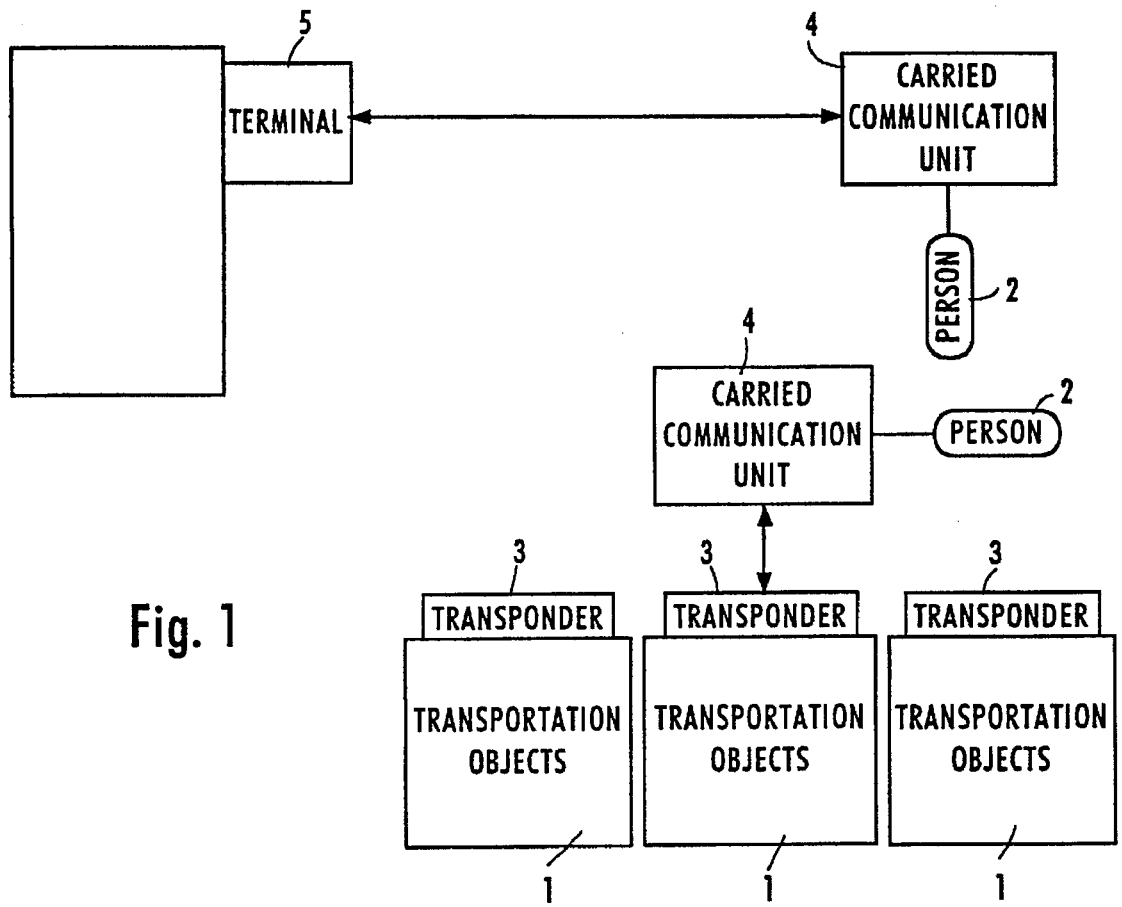

United States Patent [19]
Gunnarsson

[11] Patent Number: 5,640,164
[45] Date of Patent: Jun. 17, 1997

[54] SYSTEM FOR THE TRANSMISSION OF INFORMATION BY MICROWAVES AND A COMMUNICATION DEVICE TO BE USED IN SUCH A SYSTEM

[75] Inventor: Staffan Gunnarsson, Vallingby, Sweden

[73] Assignee: Saab-Scania Combitech Aktiebolag, Jonkoping, Sweden

[21] Appl. No.: 290,755

[22] PCT Filed: Feb. 12, 1993

[86] PCT No.: PCT/SE93/00108

§ 371 Date: Oct. 14, 1994

§ 102(e) Date: Oct. 14, 1994

[87] PCT Pub. No.: WO93/16531

PCT Pub. Date: Aug. 19, 1993

[30] Foreign Application Priority Data

Feb. 14, 1992 [SE] Sweden ................... 9200441

[51] Int. Cl.⁶ .................... G01S 13/74; G08C 17/00; H04B 1/59
[52] U.S. Cl. .................. 342/42; 342/50; 340/825.54; 340/825.72
[58] Field of Search .................. 342/42, 50, 44; 340/825.54, 825.72, 570; 235/375, 385

[56] References Cited

U.S. PATENT DOCUMENTS

| 3,247,510 | 4/1966 | Molnar et al. ................ 342/44 |
| 4,804,961 | 2/1989 | Hane ............................. 342/42 |
| 4,837,568 | 6/1989 | Snaper ........................ 340/825.54 |
| 5,006,996 | 4/1991 | Nakamura et al. .......... 340/825.54 |
| 5,113,349 | 5/1992 | Nakamura et al. .......... 340/825.54 |
| 5,214,410 | 5/1993 | Verster ....................... 340/572 |

FOREIGN PATENT DOCUMENTS

| 20229631 | 7/1987 | European Pat. Off. . |
| 13916409 | 11/1989 | Germany . |
| 18702165 | 4/1987 | WIPO . |
| 19118452 | 11/1991 | WIPO . |

OTHER PUBLICATIONS

"Funk–Identifizierung, System ohne Grenzen", Funkschau, vol. 26, pp. 61–65, 1989.

*Primary Examiner*—Ian J. Lobo
*Attorney, Agent, or Firm*—Lowe, Price, LeBlanc & Becker

[57] ABSTRACT

A system for communication by means of microwaves between transponders (3) and a central unit (5) is described. It is primarily characterized by a communication unit (4) for directed communication at a relatively short distance with the transponders (3) and at a relatively long distance with the central unit (5). The communication unit (4) also comprises a memory (23) for the intermediate storing of information.

14 Claims, 2 Drawing Sheets

SYSTEM FOR THE TRANSMISSION OF INFORMATION BY MICROWAVES AND A COMMUNICATION DEVICE TO BE USED IN SUCH A SYSTEM

The present invention relates to a system for communication, that is transmission of information, by means of microwaves in at least one direction between at least one data carrier, a so-called transponder and a terminal, a so-called central unit. The invention also relates to a communication unit to be used in such a system.

BACKGROUND

When moving objects short or long distances, that is commonly "object transportation" in its modern form there are demands for identification of the objects in question. These may be individual objects, pallets with objects, boxes or containers or other. The identification is important when considering efficiency or safety.

There is therefore a need for a system for reading data from the objects present in object transportation. Usually, these data are required to be forwarded to some superior system or centre. In certain cases it is desired to refer information to the objects from this centre, for example with the purpose to limit the demands on the geographical covering of the centre.

There are other areas, where there is a need to forward information from data carrying objects to a more or less distant centre, for example in connection with rental cars. Also human objects, that is persons, such as sportsmen on check-ups or persons for which safety check-ups are needed can be provided with data carriers, from which information can be transmitted to such a centre.

Hitherto it has proven difficult to achieve efficient systems of this kind. One suggestion has implied that the objects in question were provided with an optic code, for example a bar code, which was read with a manually carried reading pistol that was connected to a radio transmitter for communication with the superior system, that is the centre. Quite extensive apparatus is required for the purpose, as separate media are used for communication with the object, or rather the data carrying device on it, and communication with the centre. In practice, different physical units must be used for the optic reading and radio transmission, respectively. It is difficult to get general frequency permission for radio transmission, since different radio bands are allowed in different countries. Furthermore, communication at radio frequency does not admit compact directed antennae, which leads to high demands on transmitted effect and problems with interferences between different equipment.

Another proposed system for the transmission of information from objects to a centre is presented in PCT/US91/05234. Here, a communication unit is used to communicate, on one hand with a number of objects of different kinds, all provided with small radio transmitters, and on the other hand with a centre. In the first case FM radio waves of relatively low effect are used and in the second case FM radio waves of relatively high effect are used. The communication unit is provided with a memory. Such a system shows the same disadvantages as the one just mentioned, but is still more expensive, because every object must be provided with its own radio transmitter.

Moreover, none of the two mentioned systems admits that the information data on the objects are changed wirelessly.

A technique that has been used for a long time relates to so-called transponders, that is small units, which through radiation, especially with microwaves, are brought to emit a signal containing coded information. SE-364 677 with priority from 5 May 1970 describes identification of vehicles, equipped with transponders, which are activated through radiation with a microwave signal from a questioning station, that is a centre, which is rigidly mounted.

Transponders of this kind are also described in SE-750 3620 and SE-760 9732. The latter of these patents relates to an embodiment of a central unit and transponder, which admits that data are transmitted also from the central unit to the transponder.

Transponders can contain relatively great amounts of information, but they can only be read at a relatively short distance, in the order of a few meters. They are consequently not usable for the identification of goods in various situations, for example on a loading platform or airport, where difficulties are encountered with bringing the objects within reading distance from a central unit.

THE OBJECT OF THE INVENTION

The object of the invention is to achieve a system of the kind mentioned in the introduction, which admits communication between a data carrier in the form of a transponder and a terminal, here called central unit, at relatively long distances, in flexible situations. The system shall be reliable, inexpensive in construction and in all useful without hindrance due to restrictions on permitted frequency ranges etc. Secondly, the system shall also admit that the information is forwarded from a central unit to a transponder.

DESCRIPTION OF THE INVENTION

According to the invention a system of the kind mentioned in the introduction is characterized in that it comprises a communication unit, provided with a first means for directed reception and transmission of information from a possibly to said transponder at a relatively short distance, and to and possibly from said central unit at a relatively long distance, the communication unit also being provided with a memory for the intermediate storing of such information.

Thus, a very flexible system is achieved for the identification of objects exposed to displacement, that is goods handling. The transponder has a good capacity for data and is insensitive to filth and mechanical damages. The transponder can either be of an exclusively reflecting type, as described in SE-750 3620, in which case no other energy is needed in the transponder than what is brought to it with the microwave that is emitted from the communication unit, or be provided with an internal battery, for supplying its modulation means, which increases the possible distance between the communication unit and the transponder. The technical embodiment of the transponder and the central unit is known, partly through said Swedish patents and partly through numerous later publications, and is therefore not described here. It may be mentioned, that a number of different modulation forms have been tested through a corresponding embodiment of the electronic circuits and components of the transponder, for modulation of the microwave incident of the transponder, that is "the questioning signal", with an identifying code.

In a preferred embodiment of the device the communication unit is provided with a second means for the manual feeding of information to it, for further transmission to the transponder or central unit. This can either be effected via the memory or directly to the transponder or central unit. This second means consists suitably of a key set, for example designed as the one used on modern telephone apparatus.

The antenna device of the communication unit can be designed in various ways with the aim to achieve directivity. It is suitable to use the same antenna device for both reception and transmission with active antenna elements in patch or dipole technique. Directivity can be achieved by grouping several antenna elements. Another way to achieve directivity is, as with a Yagi antenna, to arrange one or more resonant directors in the area immediately in front of the active antenna element, and in addition locate a signal reflector at a suitable distance behind the active antenna element. The directors can for example be designed as wire elements or metallic surfaces, while the reflector in a preferred embodiment consists of a surface, suitably of metal. To limit the physical extension along the radiation axis of the antenna the directors may be located in a dielectric material, through which arrangement their mutual distance can be limited relatively if they were located in air. The antenna device of the central unit can be omnidirectional.

In a preferred embodiment of the communication unit according to the invention it is arranged to communicate with both the transponder and the central unit by means of microwaves of essentially the same frequency.

A number of possibilities are at hand with regard to the modulation forms. For example, both amplitude and phase modulation occur between the transponder and the communication unit, as well as between the communication unit and the terminal. Examples of alternatives are pulse modulation ASK (Amplitude Shift Keying), PSK (Phase Shift Keying) and QPSK (Quadrature Phase Shift Keying), each one of which methods can be used with different coding, for example with different forms of direct or differential frequency shift and phase shift.

In a preferred embodiment of the device, the communication unit comprises a third means for indicating the communication functions of the communication unit. Hereby, data can be checked in the information transmission, partly from the transponder and central unit and partly the data that are fed to the communication unit via the keys, if it is provided with such a function.

Figure 2:
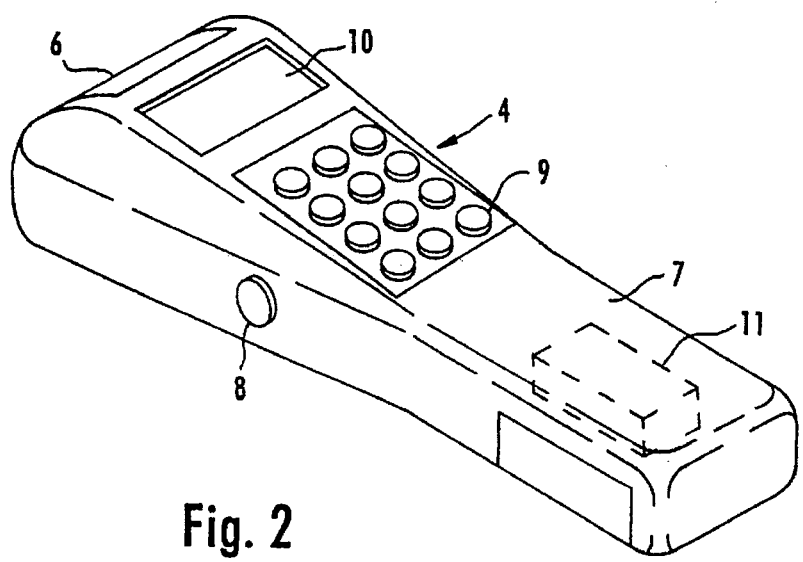
Figure 3:
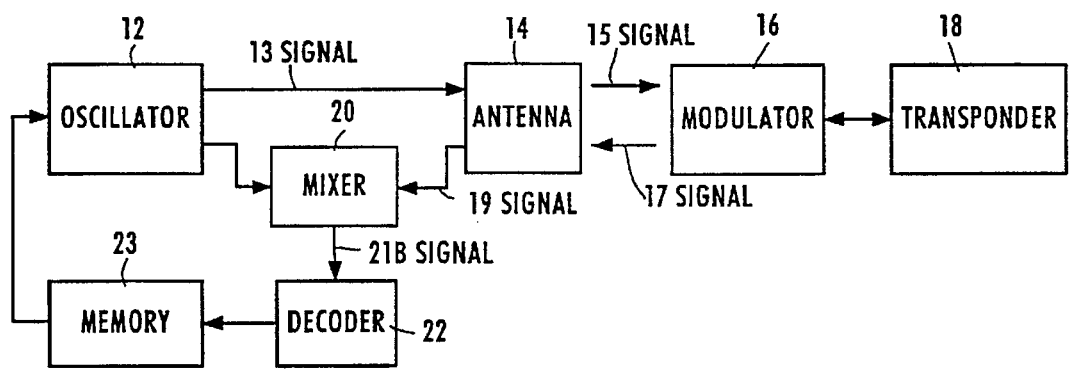
Figure 4:
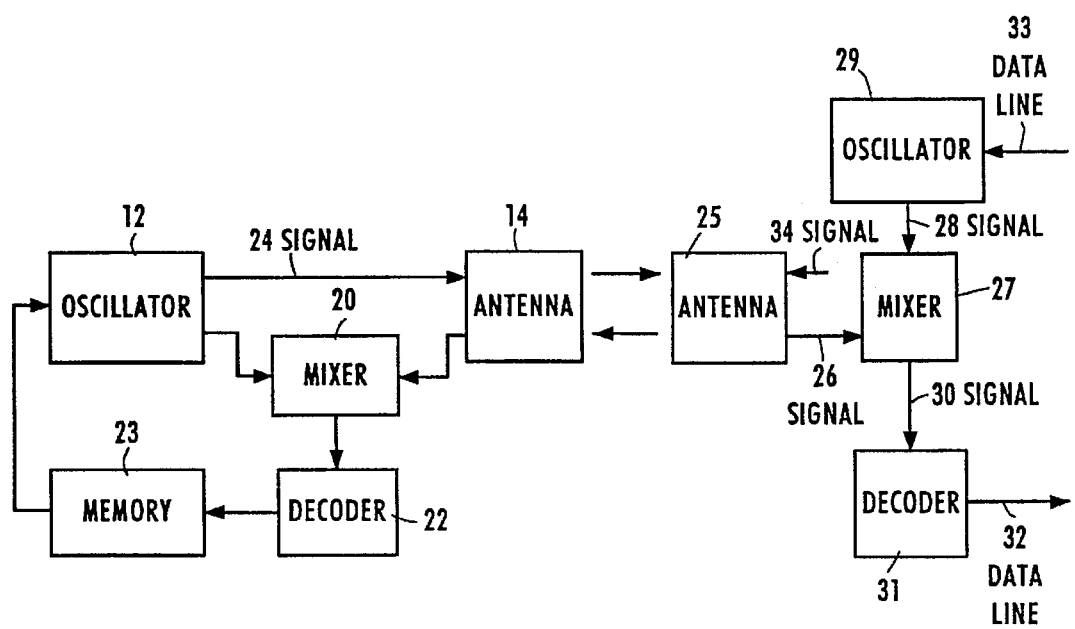

The invention will be described more in detail in the following with reference to the accompanying figures. On these it is shown by FIG. 1 a diagram on a system according to the invention;

FIG. 2 a perspective view of a communication unit according to the invention,

FIG. 3 a block diagram on a communication unit on communication with a transponder, and FIG. 4 a block diagram on a communication unit on communication with a central unit.

FIG. 1 shows a typical situation at a goods terminal, where the transportation objects 1, for example containers, shall be identified by a person 2. The transportation objects are provided with microwave transponders 3, which communicate, that is, are read and possibly written, with the aid of a carried communication unit 4.

After completed reading, the person turns at a terminal building at which a terminal 5 is located. By directing the communication unit 4 at the terminal 5 the read information from the transponders can be fed into the central system. The procedure can also take place in the opposite way, that is, first the person loads the communication unit with data from the terminal, and thereupon feeds data into the respective transponder.

Suitably, the unit is provided with a trigger 8 to initiate a communication sequence, and manoeuvering means 9 for switching between communication with terminal and transponder, writing or reading and for input of different parameter values on the communication. For example, a key set can be arranged on the communication unit so that certain data can be freely written into the transponders.

An indicator 10 is used for checking the status of the unit, and for displaying actual data. In the unit, a power source 11 is encompassed in the form of an accumulator or battery. The communication unit can additionally be provided with a data storing cassette, for example in the form of memory cards or data media.

FIG. 3 showns a way to effect transponder communication with the communication unit. Starting from a microwave oscillator 12, a signal 13 is led at for example 2.45 GHz to an antenna means 14. The antenna means emits the signal as a first microwave signal 15 to the antenna and modulation means 16 of a transponder unit, where a second microwave signal 17 in the form of information side bands is formed out of the memory contents of the transponder oscillator-memory circuit 18.

The second, data carrying microwave signal is referred back to the antenna means 14 of the communication unit, is forwarded therefrom as signal 19 to a mixer 20 to be mixed with signal 21a, of the same frequency as the first microwave signal 13.

After the mixing, the information sideband and emitted signal give a low frequency data signal 21b which in a data decoder 22 is converted to control and data signals for an intermediate storing memory 23 in the communication unit. Thus, data have now been transmitted from the transponder to the communication unit.

It is also possible to write data into the transponder. Data from the intermediate storing memory 23 can then act on the microwave generating in 12 in a way representitive of data, so that when the signal is received by the antenna means 16 of the transponder, the transponder memory circuits 18 can store data from the intermedite storing memory 23. Thus, data have been transmitted from the communication unit to the transponder.

FIG. 4 shows the transmission of intermediate storing data between the communication unit and terminal.

The intermediate memory 23, with data from the transponders, then affects the production of microwaves in 12 in a way representative of data so that a data signal 24 is formed to the antenna means 14.

When this is directed towards the antenna means 25 of the terminal, the microwave signal with modulated data 26 will be fed to a signal mixer 27 in the terminal, and there it is mixed with a microwave signal 28 of a nearby lying frequency, generated in the microwave oscillator 29. For example the signal 24 can be pulse modulated with data at 2.45 GHz, and when it is mixed with a signal at 2.46 GHz from the oscillator 29 it can generate a pulsed intermediate frequency 30 at 10 MHz which with good noise factor is received, amplified and decoded in the unit 31. Thus, data have been transmitted from the communication unit to the terminal and can be emitted to a superior system via the data line 32.

Data can also be led from the terminal to the communication unit, for example to acknowledge a received message from the communication unit. Hereby, data via the data line 33 can affect the production of microwave signals in 29 so that a modulated signal 34 is led to the antenna means 25 of the terminal to be radiated out in space. The signal, which for example can be pulse modulated, is caught by the antenna means 14 of the communication unit and is led to the mixer 20 where it is mixed with a nereby lying microwave frequency from 12, to be received and decoded with good sensitivity in the decoding unit 22.

With the purpose to make sure that the message reaches the correct destination and with sender identity it is also suitable to include identification codes in the signal, not only from the transponders but also from the communication unit and terminal.

I claim:

1. A system for communication, that is transmission of information by means of microwaves in at least one direction between at least one transponder (3), and a central unit (5) characterized in that a portable communication unit (4), provided with a first means (6,14) for at least one of directed transmission and reception of information to and possible from said central unit (5) at a first distance, and for at least one of directed reception and transmission of the information from and possibly to said transponder (3) at a second distance that is substantially shorter in comparison with the first distance, the portable communication unit (4) also being provided with a memory (23) for the immediate storage of the information, and said portable communication unit communicating with said transponder using first microwaves, and communicating with said central unit using second microwaves, the first and second microwaves being of essentially the same frequency, and the transponder being of a reflecting type with or without a battery for modulating the information.

2. A portable communication unit (4) for use in a system for communication, that is transmission of information by means of microwaves in at least one direction between at least one transponder (3), and a central unit (5), characterized in that said portable communication unit is provided with a first means (6,14) for at least one of directed reception and transmission from and possibly to said transponder (3) at a first distance, and to and possibly from said central unit (5) at a second distance that is substantially longer in comparison with the first distance, the portable communication unit also being provided with a memory (223) for the intermediate storing of the information, and said portable communication unit communicating with said transponder using first microwaves, and communicating with said central unit using second microwaves, the first and second microwaves being of essentially the same frequency, and the transponder being of a reflecting type with or without a battery for modulating the information.

3. A communication unit according to claim 2, characterized in that said communication unit is further provided with a second means (9) for the manual feeding of the information to the communication unit (4), for further transmission to the transponder (3) or the central unit (5).

4. A communication unit according to claim 2, characterized by said first means (6,14) comprising an antenna device intended for communication with both the transponder (3) and the central unit (5).

5. A communication unit according to claim 4, characterized in that said antenna means is designed in the form of at least one patch antenna (6,14).

6. A communication unit according to claim 4, characterized in that said antenna means is designed in the form of at least one dipole antenna (6,14).

7. A communication unit according to claim 4, characterized in that said antenna means is designed in the form of a directed patch antenna, in front of which directors are placed (6, 14).

8. A communication unit according to claim 2, characterized in that said communication unit comprises a third means (10) for indication of the communication functions of the communication unit (4).

9. An identification system for reading information from data carrying objects in transport and for transmitting the information to a central control terminal, comprising:

a data carrying object containing data to be read therefrom;

a transponder, affixed to said data carrying object, and storing the data to be read, and said transponder being of a reflecting type optionally including a battery for modulating the information, said transponder further comprising a non-transmitting transponder;

control terminal means for transmitting the data to be read to a central system; and a portable communication unit, reading the data from said transponder via a first microwave signal, and transmitting the data to said control terminal means via a second microwave signal, said portable communication unit being positioned in a first location substantially near said transponder for reading the data stored therein, and being positioned in a second location for transmitting the data to said control terminal means which is located in a third location relatively and substantially distant from the first and second locations, wherein the first and second microwave signals are of substantially the same frequency.

10. A system according to claim 9, wherein said portable communication unit comprises:

a microwave oscillator circuit generating the first microwave signal according to the frequency for reading the data;

at least one antenna connected to said microwave oscillator transmitting the first microwave signal and receiving a transponder signal from said transponder;

a mixer connected to said antenna and to said microwave oscillator, receiving the first microwave signal from said microwave oscillator and the transponder signal from said transponder via said antenna, and mixing the first microwave signal with said transponder signal and producing mixed signals;

a data decoder connected to said mixer, and decoding said mixed signals producing decoded signals; and a memory connected to said data decoder, receiving said decoded signals from said data decoder and storing said decoded signals for transmission to said central system via said control terminal means.

11. A system according to claim 9, further comprising a microwave oscillator in the portable communication unit, wherein the same microwave oscillator is used for reading from and/or writing to the transponder and also for transferring data to and/or from said central control terminal.

12. An identification system for reading information from data carrying objects in transport and for transmitting the information to a central control terminal, comprising:

a data carrying object containing data to be read therefrom;

a transponder, affixed to said data carrying object, and storing the data to be read, and said transponder being of a reflecting type optionally including a battery for modulating the information, said transponder further comprising a non-transmitting transponder;

control terminal means for transmitting the data to be read to a central system; and a portable communication unit, reading the data from said transponder via a first microwave signal, and transmitting the data to said control terminal means via a second microwave signal, said portable communication unit being positioned in a first location substantially near said transponder for reading the data stored therein, and being positioned in a second location for transmitting the data to said control terminal means which is located in a third location relatively and substantially distant from the first and second locations, wherein said control terminal means transfers the information using a third microwave signal to said portable communication unit for intermediate storage in a memory in the portable communication unit and said portable communication unit further forwards the information to said transponder via a fourth microwave signal of essentially the same frequency as the third microwave signal used for forwarding the information from said control terminal means to said portable communication unit.

13. A system according to claim 12, wherein said portable communication unit comprises:

a microwave oscillator circuit generating the first microwave signal according to the first frequency for reading the data;

at least one antenna connected to said microwave oscillator transmitting the first microwave signal and receiving a transponder signal from said transponder;

a mixer connected to said antenna and to said microwave oscillator, receiving the first microwave signal from said microwave oscillator and the transponder signal from said transponder via said antenna, and mixing the first microwave signals with said transponder signals and producing mixed signals;

a data decoder connected to said mixer, and decoding said mixed signals producing decoded signals; and a memory connected to said data decoder, receiving said decoded signals from said data decoder and storing said decoded signals for transmission to said central system via said control terminal means.

14. A system according to claim 12, further comprising a microwave oscillator in the portable communication unit, wherein the same microwave oscillator is used for reading from and/or writing to the transponder and also for transferring data to and/or from said central control terminal.

* * * * *